United States Patent [19]

Tozoni

[11] Patent Number: 5,225,726
[45] Date of Patent: Jul. 6, 1993

US005225726A

[54] LINEAR SYNCHRONOUS MOTOR HAVING ENHANCED LEVITATIONAL FORCES

[75] Inventor: Oleg Tozoni, Rockville, Md.

[73] Assignee: Maglev Technology, Inc., Gaithersburg, Md.

[21] Appl. No.: 764,734

[22] Filed: Sep. 24, 1991

Related U.S. Application Data

[63] Continuation-in-part of Ser. No. 691,430, Apr. 25, 1991, which is a continuation-in-part of Ser. No. 583,082, Sep. 17, 1990, abandoned.

[51] Int. Cl.$^5$ .................. H02K 41/00; B60L 13/04
[52] U.S. Cl. .................. 310/120; 310/156; 104/282
[58] Field of Search .................. 310/12, 13, 14, 46, 310/156; 318/135; 104/282, 283, 286

[56] References Cited

U.S. PATENT DOCUMENTS

| | | | |
|---|---|---|---|
| 4,131,811 | 12/1978 | Apsit et al. | 310/12 |
| 4,517,514 | 5/1985 | Howell | 324/207 |
| 4,603,640 | 8/1986 | Miller et al. | 104/282 |
| 4,624,617 | 11/1986 | Belna | 414/347 |
| 4,953,470 | 9/1990 | Yamaguchi | 104/282 |

OTHER PUBLICATIONS

Argonne National Laboratory: Maglev Vehicles and Superconductor Technology: Integration of High Speed Ground Trans. into the Air Travel Sys., Johnson et al., Apr. 1989.

Primary Examiner—Steven L. Stephan
Assistant Examiner—Matthew Nguyen
Attorney, Agent, or Firm—Kenyon & Kenyon

[57] ABSTRACT

A linear synchronous motor for a high speed, ground transportation vehicle includes a linear stator assembly that is divided into sections. The stator assembly has an air gap and generates a magnetic field traveling wave therein from a constant frequency alternating current. The traveling wave has variable speeds and accelerations along different sections of the stator. A rotor assembly has a plurality of magnets forming at least one pole-pitch of a variable length. The rotor assembly is coupled to the vehicle and disposed in the air gap of the stator and runs laterally therewith, producing an attractive force between a magnetic field of the rotor and the traveling wave of the stator. The rotor has at least one magnet that includes an upper portion, a lower portion spaced apart from the upper portion, and a nonmagnetic coupler rigidly coupling the upper portion of the magnet to the lower portion. The magnetic field of the rotor propels the vehicle. The magnetic field of the rotor also generates a levitation force levitating the vehicle. A synchronizing unit is operatively associated with the rotor assembly to vary the length of the pole-pitch so that the pole-pitch length is substantially equal to one-half the length of the traveling wave at any given position along the linear stator assembly.

19 Claims, 7 Drawing Sheets

LINEAR SYNCHRONOUS MOTOR HAVING ENHANCED LEVITATIONAL FORCES

CROSS REFERENCE TO RELATED APPLICATIONS

This application is a continuation-in-part of application Ser. No. 691,430, filed Apr. 25, 1991, which is a continuation-in-part of application Ser. No. 583,082, filed Sep. 17, 1990, now abandoned.

BACKGROUND OF THE INVENTION

The present invention relates generally to linear synchronous motors and more particularly to a linear synchronous motor having variable pole pitches generating propulsion and levitation forces for a high speed transportation system where the stator defines a guideway for the transportation vehicle.

The proposed linear synchronous motor represents an improvement over the linear synchronous motor having variable pole pitches that is described in U.S. patent application Ser. No. 691,430, the disclosure of which is incorporated herein by reference.

Because the stator of the linear synchronous motor utilizes a current of constant frequency, a change in the speed of the rotor is achieved by proportionally changing the length of the phase coils of the stator winding and the pole pitches of the rotor. In the process, the mean value of the induction in the air gap between the rotor and the stator does not change, but the area defined by the loops of the phase coils changes in direct proportion to their length. Therefore the magnetic flux traversing the phase coils of the stator's windings increases along the acceleration section of the guideway/stator in proportion to the increase in the vehicle's speed.

In a linear synchronous motor having variable pole pitches the lines of force of the magnetic field form a loop that closes between the adjacent poles of the rotor and which passes through the steel cores. Therefore, the total magnetic flux linked to each phase coil must flow through the cross-sectional area of each core. Hence, the magnetic flux passing through the cross section of the core increases as the speed of the vehicle increases. If the cores are manufactured with equal cross-sectional dimensions along the entire course of the guideway/stator, then within the core, the flux density (i.e., the magnetic induction in the steel core) will increase in the accelerating section, attaining a magnitude within the constant-speed section that exceeds the permissible saturation of the magnetic steel. Once saturation is reached, the magnetic resistance of the cores dramatically increases, the flux decreases, and the tractive and levitational forces of the linear motor decrease as well. To avoid these problems, the cross-sectional dimension of the stator cores must be increased in proportion to the increase in the speed of the vehicle along each section of the guideway/stator. Consequently, the quantity of steel required for constructing the cores is very high, as are the associated costs.

In the linear synchronous motor disclosed in the copending application, the levitational force is achieved by deforming the magnetic field in the air gap that is created by the rotor's permanent magnets. The rotor is displaced downward relative to the stator cores as a result of the weight of the vehicle. Consequently, there is a deformation of those portions of the uniform magnetic field in the air gap that are near the top and bottom edges of the permanent magnet. As a result, the tubes of the magnetic field (i.e., the region between parallel lines of the magnetic field) are stretched, and the magnetic lines of force are lengthened. The magnetic tubes, which characteristically attempt to minimize their length, create forces that have vertical components that attract the magnets to the steel cores. The vector sum of the attracting forces creates the levitating force of the motor.

Figure 4A:
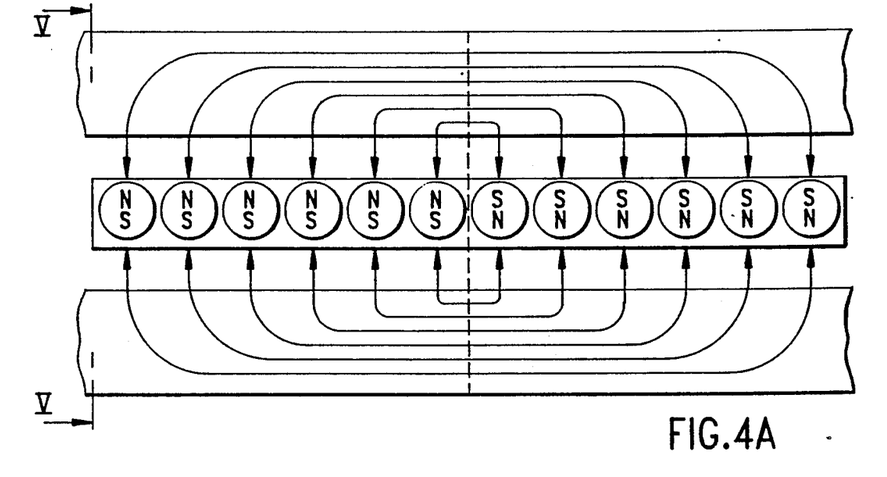
FIG. 4A is a plan view of the stator and rotor disclosed in the copending application schematically illustrating the closed tubes of magnetic flux passing through the iron cores of the stator and FIG. 4B is a cross-sectional view taken along line V—V in FIG. 4A schematically illustrating the magnetic field distribution in the air gap of the stator disclosed in the copending application.
Figure 4B:
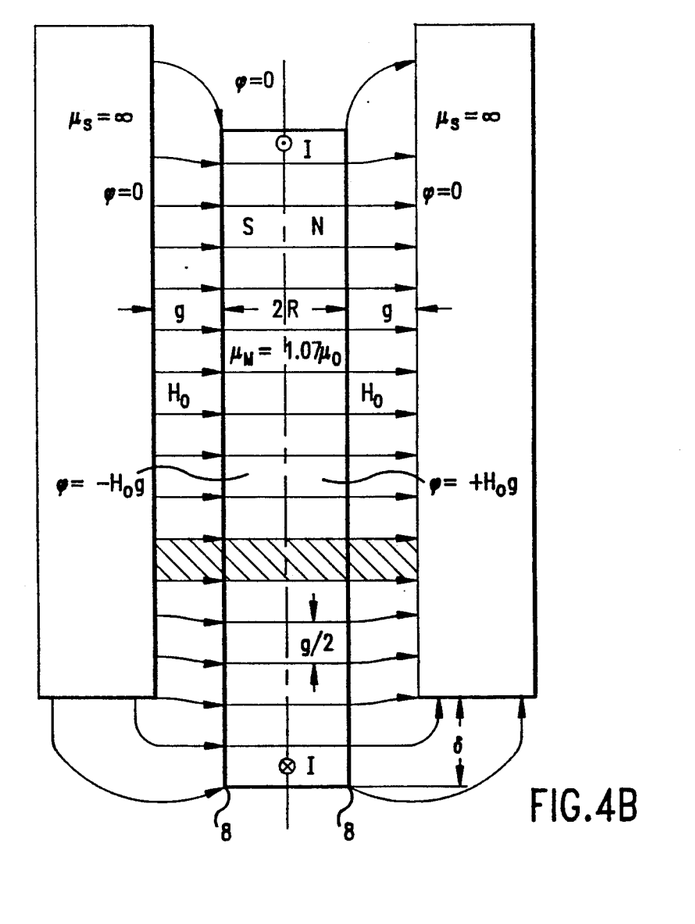

As can be seen in FIG. 4B, corresponding to FIG. 8 of copending patent application Ser. No. 691,430, when the rotor is shifted downward, only a small portion of the uniform magnetic field is actually deformed. The magnetic field remains uniform along most of the length of the air gap and hence does not participate in the creation of a levitational force. Therefore, most of the energy from the rotor's permanent magnets is not effectively used to generate the levitational force of the motor.

SUMMARY OF THE INVENTION

The present invention overcomes these limitations by providing a linear synchronous motor for a high speed vehicle that includes a linear stator assembly divided into sections, which has an air gap. The stator assembly generates a magnetic field traveling wave within the air gap from a constant frequency alternating current, and the traveling wave has variable speeds and accelerations along different sections of the stator. The motor also includes a rotor assembly that has at least one propulsion magnet which forms at least one pole-pitch of a specifiable length. The propulsion magnet includes an upper portion, a lower portion spaced apart from the upper portion, and a nonmagnetic coupler rigidly coupling the upper portion to the lower portion. The rotor assembly is coupled to the vehicle and is disposed in the air gap of the stator, running laterally therewith. The rotor assembly generates a magnetic flux that produces an attractive force between a magnetic field of the rotor and the traveling wave of the stator. The magnetic field of the rotor propels the vehicle and generates a levitation force levitating the vehicle. A synchronizing unit operatively associated with the rotor assembly varies the length of the pole-pitch such that the pole-pitch length is substantially equal to one-half the length of the traveling wave at any given position along the linear stator assembly.

Similar to the linear synchronous motor disclosed in the copending application, the linear synchronous motor of the present invention includes a stationary element acting as a track and a movable element coupled to a vehicle that travels on the track. The stationary element forms a guideway/stator that extends between two adjacent stations. The movable part forms a propulsion/levitation magnet comprising at least one rotatable permanent magnet whose orientation defines pole pitches of selectively variable length. The stator is divided along its length into three sections: an acceleration section, a constant-speed section, and a deceleration section. The stator has phase coils that vary in dimension, as disclosed in the copending application. The coils are formed from windings that are supplied with three phase alternating current of constant frequency, which generate within the air gap a magnetic field travelling wave that has a variable speed and acceleration.

The rotor is rigidly attached to the vehicle and disposed in the air gap of the stator. The Lorentzian interaction between the magnetic field generated by the permanent magnets of the rotor and the traveling wave generated by the three phase current flowing in the stator windings causes the rotor to move along the stator. Hence, it is the magnetic field of the propulsion magnet that propels the vehicle.

The propulsion magnets of the rotor are formed by a series of identical permanent magnets shaped as right circular cylinders. The magnets are disposed in a steel magazine coupled to the vehicle. A synchronizing device (i.e., a pole-pitch regulator) interacting with the rotor automatically alters the pole pitch length so that it approximately equals ½ the length of the magnetic traveling wave at any given position of the rotor along the guideway/stator.

The longitudinal axes of the cylindrical magnets extend in a vertical plane that is parallel to the direction of the vehicle's motion. All of the permanent magnets are magnetized in a direction perpendicular to their respective longitudinal axes. Thus, each half of the cylinder, which is defined by a vertical plane through the longitudinal axis, forms a magnetic pole of opposite sign with respect to the other pole. By rotating one or more of the cylindrical magnets within the steel magazine, it is possible to gradually change the length of the pole pitches, thus ensuring a regime in which the motor is synchronized during acceleration or deceleration of the vehicle. Synchronization of the linear synchronous motor occurs when the magnetic fields of the stator and the rotor travel in the same direction at the same speed.

The propulsion force of the motor arises from the sum of the Lorentzian forces produced by the interaction between the magnetic field of the permanent magnets and the traveling wave created by the three phase current flowing in the stator windings. The levitational force of the motor results from the attraction of the rotor's permanent magnets to the stator's steel cores. This attraction arises when the propulsion magnet is shifted downward relative to the stator cores by the weight of the vehicle. Both the propulsion and levitation forces are self-regulating. The propulsion force automatically overcomes the force resisting the movement of the vehicle while the levitation force automatically equals the force of the vehicle's weight.

The following features distinguish the linear synchronous motor of the present invention from the motor disclosed in the copending application. First, all the cylindrical permanent magnets, together with their magnetic magazines, are divided into two equal parts along a horizontal plane. A non-magnetic bridge and cylindrical couplers are inserted between the two parts of each magnet. The couplers rigidly couple the two parts of the magnet, which together form a magnetic assembly. Furthermore, both parts of each magnetic assembly are oriented so that the magnetization vectors of the upper and lower parts face in opposite directions. The magnetization vectors of both the upper and lower parts of the magnetic assembly are perpendicular to the longitudinal axis of the magnet and the vehicle's direction of motion. Each magnetic assembly can be rotated about its longitudinal axis, thus altering, with the aid of the pole pitch regulator, the length of the pole pitches during the acceleration and deceleration of the vehicle.

Second, the stator cores comprise a back portion and two pole projections. The projections protrude into the air gap of the stator and they each have their own three phase windings. The phase coils of the windings are linked so that at any given moment in time the currents in the corresponding coils of the upper and lower projections travel in opposite directions relative to one another. Therefore, the direction of the magnetic field generated by the current in the coil of the upper projection is the same as the direction of magnetization of the upper part of the rotor's magnetic assembly. Likewise, the direction of the magnetic field generated by the current in the coil of the lower projection is the same as the direction of magnetization of the lower part of the rotor's magnetic assembly. Because of this configuration, the cross section of the linear synchronous motor in a plane perpendicular to the vehicles's direction of motion effectively has two working areas in the air gap with magnetic fields directed oppositely to one another, in contrast to the motor disclosed in the copending application, which has only one working area in the air gap with a magnetic field oriented in only one direction.

The three phase windings of the stator are formed as concentric phase coils. This configuration allows the stator to be manufactured in separate sections without dividing coil loops.

The above-mentioned distinctions between the structure of the motor in the present invention and the motor in the copending application significantly effects the electromagnetic process that takes place in the motor, improving its performance substantially. In the linear synchronous motor disclosed in the copending application, the magnetic flux passes through the steel cores and forms a loop that closes between adjacent poles of the rotor. The poles are located laterally along the core at a distance from one another that is equal to the length of the stator phase coils. In contrast, in the linear synchronous motor of the present invention, the magnetic flux forms a closed loop in a plane perpendicular to the direction of the vehicle's motion, flowing into one of the pole projections, through the core back, and out the other pole projection.

Given a core of equal cross-sectional area, the cross-magnetic permeance of the stator core in the present invention is many times greater that the longitudinal permeance of the stator core in the copending application. Additionally, the cross permeance of the stator cores in the present invention change along the guideway/stator in direct proportion to the change in length of the phase coils of the stator windings, while the longitudinal permeance of the stator cores in the copending application decreases as the length of the phase coils increases.

Because of this difference in the flow of the magnetic flux, when the linear current load is constant (i.e., when the current per meter of stator length is constant throughout the length of the stator), the mean value of the magnetic induction passing through the back portion of the stator over a period of the sinusoidal current will be equal along the entire length of the stator. This important feature of the present invention—the constant distribution of the magnetic flux in the steel core of the linear synchronous motor—makes it possible to significantly reduce the volume, weight, and cost of the stator.

A further advantage provided by the present invention results from the division of the permanent magnets of the rotor into two equal parts separated by non-magnetic couplers, along with the provision of the pole projections on the stator cores. As a result of these features, the magnitude of the levitational force of the motor is virtually doubled in comparison to the motor in the copending application, even when the rotor height is only slightly raised relative to the air gap.

DETAILED DESCRIPTION

The linear synchronous motor of the present invention will be described as a power source for a train. However, this motor may be used with other types of vehicles. Furthermore, the motor may be used for purposes other than those illustrated herein. For example, the motor may be used to launch air-borne and space-borne vehicles.

The fundamental principle and chief idea behind the construction of the linear synchronous motor of the present invention, which has enhanced levitation, is essentially the same as the fundamental principle and chief idea behind the construction of the linear synchronous motor having variable pole pitches that is described in U.S. patent application Ser. No. 691,430. For this reason, only those features of the present invention that differ from those disclosed in this copending application will be discussed below.

Figure 1:
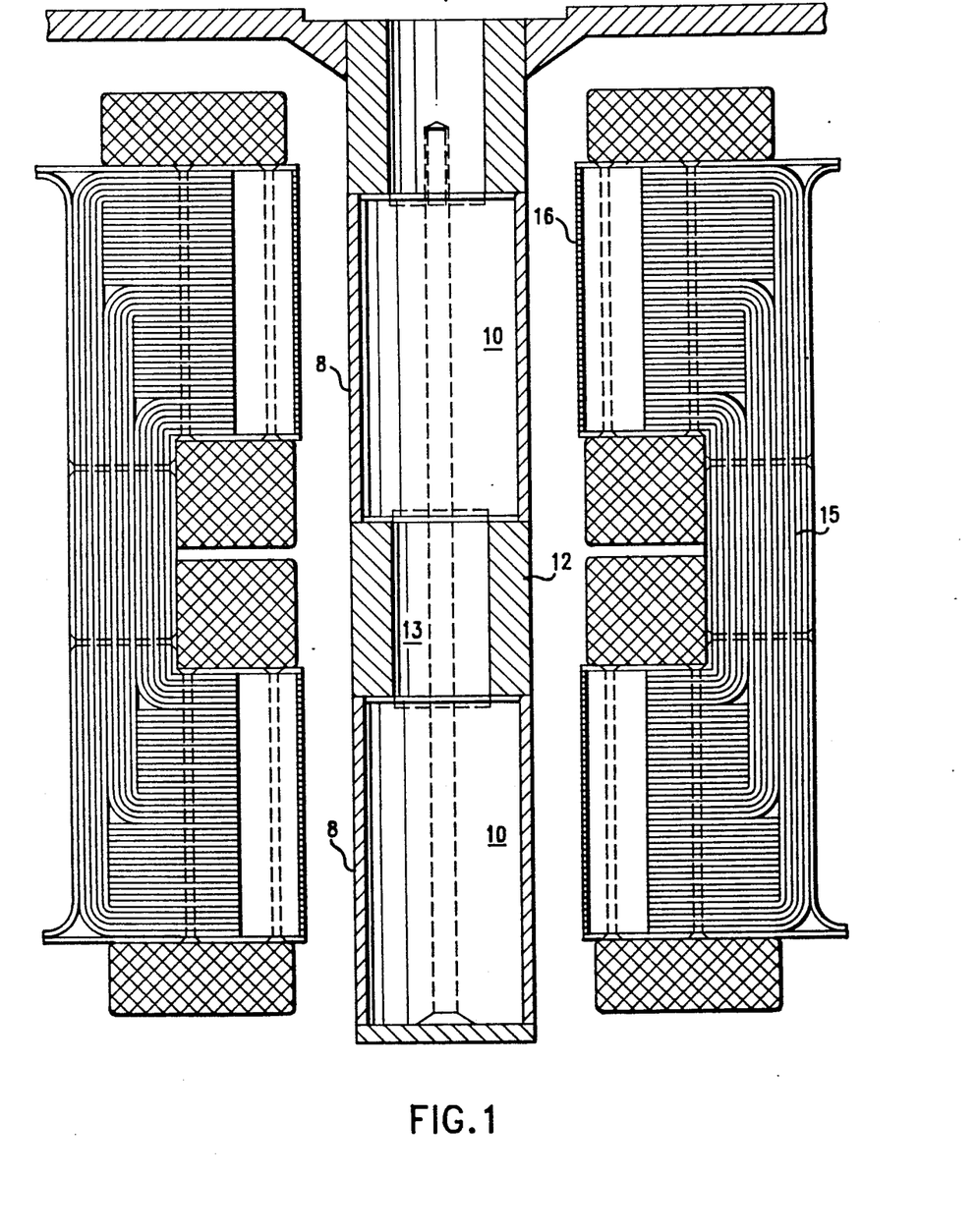
FIG. 1 is a partial cross-sectional view of the linear synchronous motor constructed according to the principles of the invention.

As seen in FIG. 1, the present invention has a rotor that includes upper and lower magnetic magazines 8 that are identical. The magazines 8 are separated by a distance equal to the height of a non-magnetic bridge 12. Similarly, the cylindrical permanent magnet assemblies of the rotor housed in the magnetic magazines 8 are formed by two identical upper and lower magnet portions 10, between which are inserted non-magnetic cylindrical couplers 13 that serve as rotational axes for the magnets. Both portions of each cylindrical magnet portion 10 are rigidly coupled to each other by the coupler 13 and are positioned so that the magnetization vectors of the upper and lower portions of the magnet face in opposite directions. Both magnetization vectors are directed along a line perpendicular to both the longitudinal axis of the magnet and the direction of the vehicle's motion.

Although in the embodiment of the invention shown in FIG. 1 the nonmagnetic couplers 13 are cylindrical, they may in fact have any desired shape as long as they couple the upper portions of the permanent magnets to each of their corresponding lower portions.

Each permanent magnet assembly formed from the upper and lower magnet portions 10 can be rotated about its longitudinal axis. The length of any given pole pitch can be simultaneously changed for both the upper and lower magazines 8 of the propulsion magnet with the aid of a computer program and sensors disposed along the guideway to locate the position of the vehicle, as well as the pole pitch mechanism described in the copending application. Thus, synchronization of the motor along the acceleration and deceleration sections of the stator is ensured.

In one advantageous embodiment of the invention, the height of the non-magnetic bridge 12 should exceed by 3.5–4 times the size of the air gap g between each stator core and the rotor.

The stator cores are manufactured from sheets of laminated electromagnetic steel that are bent into a shape similar to the letter "C". Each stator core is formed from three distinct portions visible in the cross-sectional view of FIG. 1. A back portion 15 has vertically directed laminates and two pole projections 16 project into the air gap with horizontal laminates.

Figure 2A:
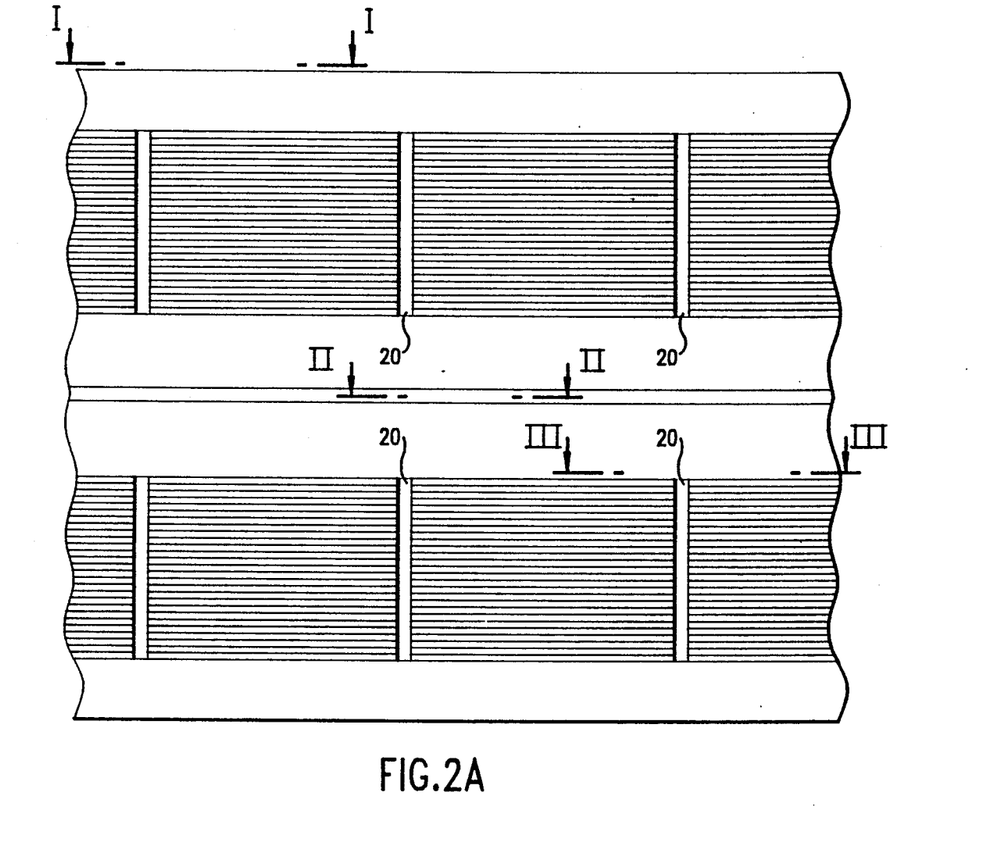
FIG. 2A is a side-view of a single iron core of the guideway/stator and FIG. 2B are partial cross-sectional views taken along the lines I—I, II—II and III—III in FIG. 2A.
Figure 2B:
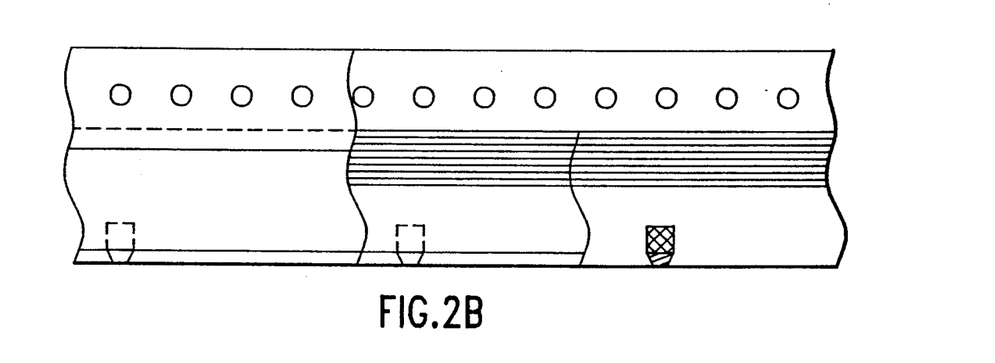

The pole projections have slots 20, shown in FIG. 2, which contain loops of triple-phase winding that form phase coils. The phase coils of the stator winding are linked so that at any point in time the currents in the corresponding slots of the upper and lower projections are equal in magnitude but opposite in direction. As a consequence, the direction of the magnetic fields generated by the upper and lower coils coincide with the directions of magnetization of both the upper and lower portions of the permanent magnets of the rotor, respectively, when the motor is synchronized. Therefore, along the cross-section of the linear synchronous motor of the invention there are two functional areas within the air gap that contain magnetic fields oppositely directed, in contrast to the linear synchronous motor described in the copending application which only has a single functional area with a magnetic field extending in only one direction.

Figure 3A:
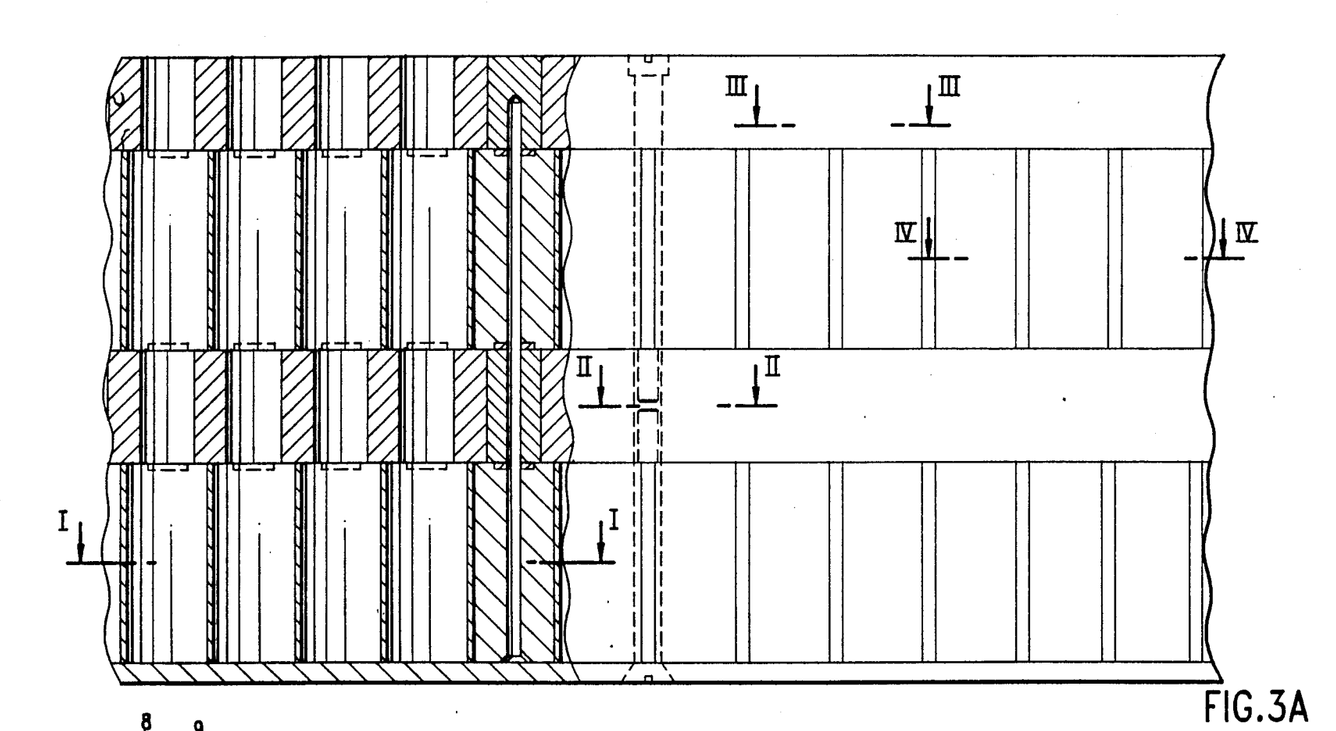
FIG. 3A is a side-view of a portion of the propulsion magnet and FIG. 3B are partial cross-sectional views taken along the lines I—I, II—II, III—III and IV—IV in FIG. 3A.
Figure 3B:
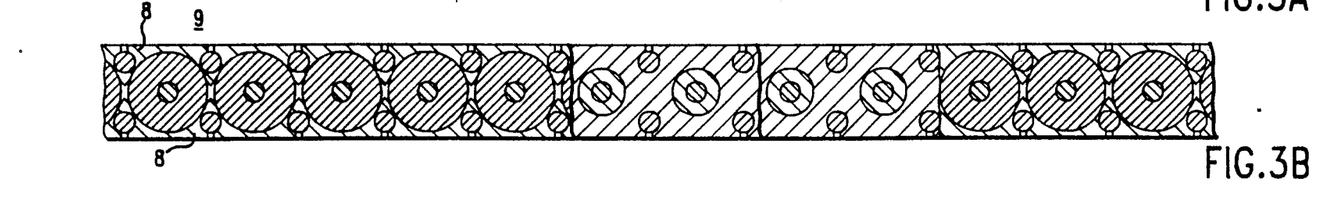

FIG. 3A is a side-view of a portion of the propulsion magnet and FIG. 3B are partial cross-sectional views taken along the lines I—I, II—II, III—III and IV-IV in FIG. 3A. Further details describing this FIG. can be found in U.S. patent application Ser. No. 691, 430, which has been incorporated herein by reference.

Figure 5:
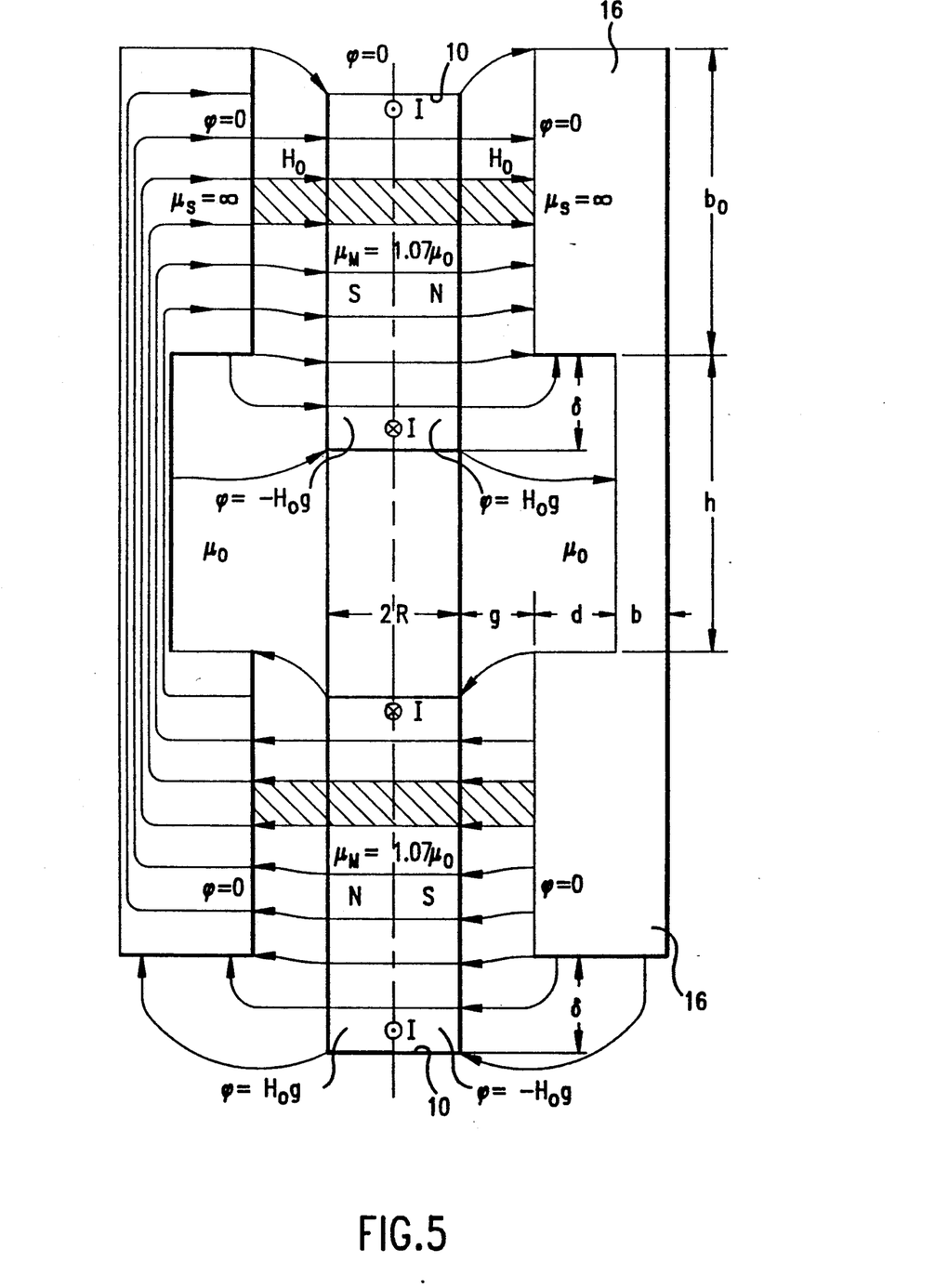
FIG. 5 is a partial cross-sectional view of the motor of the invention schematically illustrating the magnetic field distribution in the air gap.

As seen in FIG. 5, the height $b_o$ of each pole projection 16 is less than the height of the upper and lower portions 10 of the rotor magnets. The two air gaps between the projections 16 of the stator core and the magnet portions 10 each have a width g. In one specific embodiment of the invention, the height of each magnetic portion 10 is equal to 4 g to 4.5 g; the height $b_o$ of each pole projection 16 is equal to 3.5 g to 4 g; the height h of the core back is equal to 4 g to 4.5 g; and the height of the nonmagnetic bridge 12 of the rotor is equal to 3.5 g to 4 g.

Figure 6:
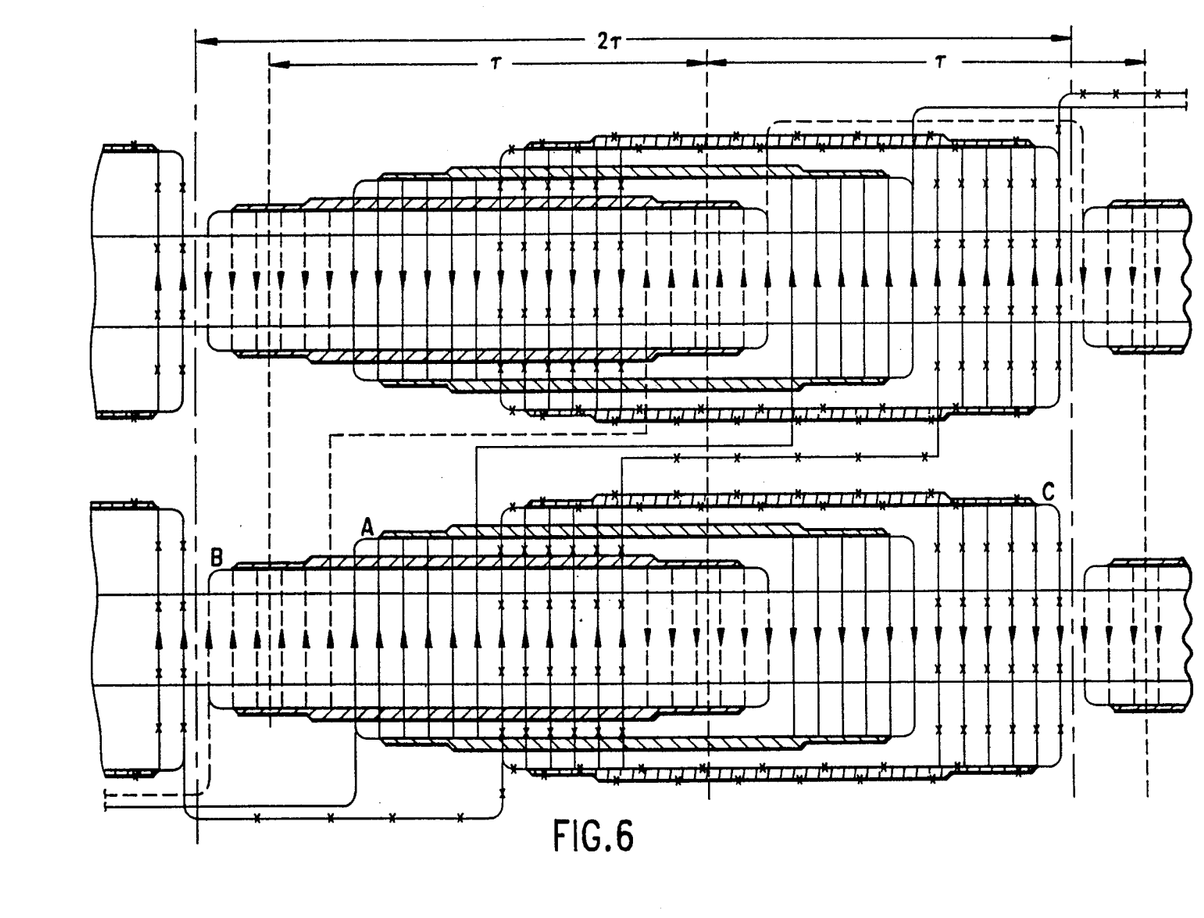
FIG. 6 is a schematic illustration of the three phase windings surrounding the stator core of the motor.

FIG. 6 schematically illustrates the three phase windings of the stator core. Each of the three phases is illustrated with a distinguishing line (i.e., solid, dashed, and solid with crosses). The Figure indicates that the windings are wound around the core and are formed as phase coils concentric with the core. Each coil has six turns or loops (in a constant-speed section of the stator) that are contained in twelve slots 20 of the pole projection 16 (see FIG. 2).

Figure 7A:
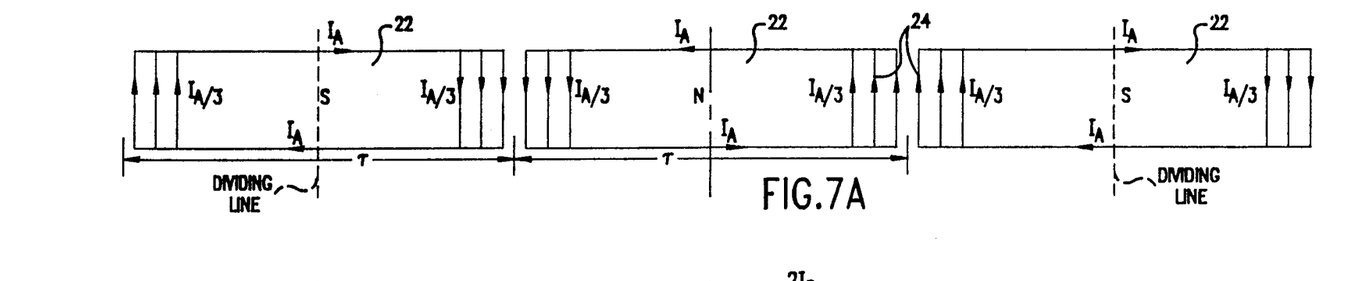
FIG. 7a is a side view schematically illustrating a single phase of the stator core with conventional windings.
Figure 7B:
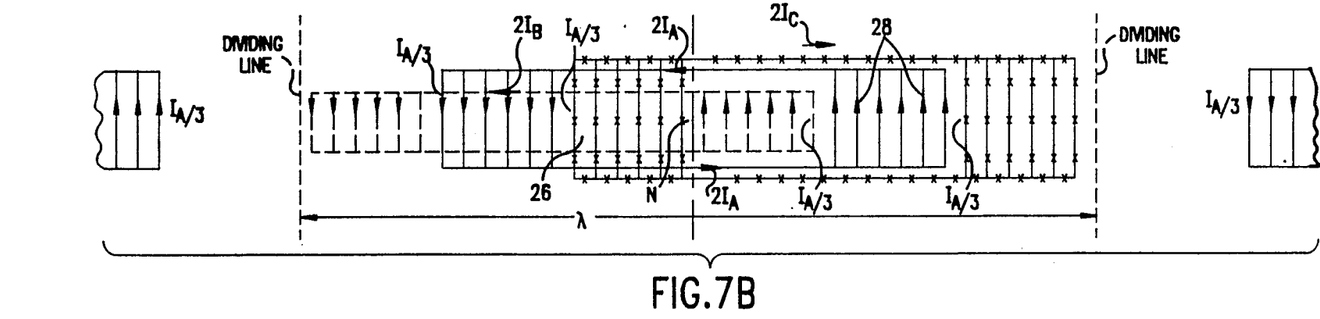
FIG. 7b is a side view schematically illustrating an alternative embodiment of the stator core windings that corresponds to the stator core shown in FIG. 6.
Figure 7C:
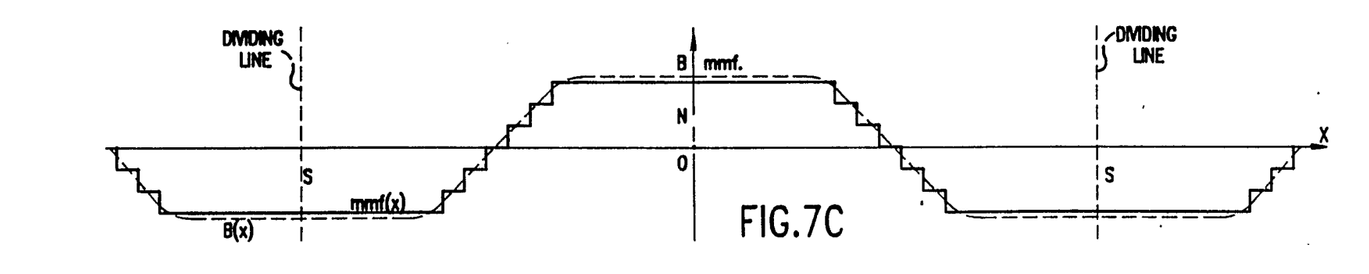
FIG. 7c shows the distribution of the magnetic field and corresponding magnetomotive force generated by either of the windings shown in FIGS. 7a or 7b.

FIG. 7 schematically illustrates a single phase of the windings (phase "A") of the stator core. FIG. 7A shows a known configuration for the coils and windings, while FIG. 7B shows the same configuration illustrated in FIG. 6. FIG. 7C shows the magnetic field and the corresponding electromotive force generated by each of the configurations shown in FIG. 7A and 7B. Although the present invention may incorporate either of the configurations shown in FIG. 7A or 7B, the configuration shown in FIG. 7B is particularly advantageous for the reasons below.

In the known design (FIG. 7A), a series of coils 22 are formed in which each coil 22 has a current traveling in the opposite direction from the current in its adjacent coil 22. The single phase of each coil 22 illustrated in FIG. 7A has three turns 24 at each end. Each of the turns 24 is disposed in its own slot 20. As FIG. 7A shows, the currents in the turns 24 of adjacent coils 22 travel in the same direction. If each of the three turns 24 carry a current $I_A/3$, then the horizontal part of coil 22 carries a total current of $I_A$.

In the configuration of the stator shown in FIG. 7B, the six turns 28 of each phase of each coil 26 correspond to the six turns 24 of adjacent coils 22 shown in FIG. 7A which carry current in the same direction. In effect, one end portion of every other coil 26 has been eliminated. Consequently, each coil 26 in FIG. 7B has twice the number of turns 28, along with twice the number of slots 20 corresponding thereto, as each coil 22 shown in FIG. 7A. Additionally, the horizontal part of coils 26 carry twice the current as the horizontal part of coils 22.

Adjacent coils 26 of the stator shown in FIG. 7B have a large distance between them and thus allow the stator, together with its concrete foundation, to be manufactured in individual sections without the need for physically dividing the loops of the phase coils. For this reason, the length of the stator sections (between the dividing lines) must be a multiple of the length of the traveling wave of the magnetic field. Each stator core has windings configured in this manner.

The structural differences indicated above between the present invention and the synchronous motor disclosed in the copending application significantly affect the electromagnetic processes occurring therein and as result significantly improve the performance of the motor.

In the present invention, the upper and lower portions of the propulsion magnet assembly, and the corresponding upper and lower stator coils, have magnetomotive forces (mmf) that are oppositely directed. These magnetomotive forces generate magnetic field lines in the motor's air gap, which are also in opposing directions. The planes of the laminates forming the various portions of the stator core are coordinated with the direction of the magnetomotive forces (i.e., the magnetomotive forces are in the planes of the laminates) since these planes form the path of least resistance through which the magnetic flux forms a closed loop through the core body.

In contrast to the present invention, the linear synchronous motor disclosed in the copending application has a magnetic flux generated by the rotor's permanent magnets that forms a closed loop extending along the stator core and along the permanent magnets of the rotor. In other words, the magnetic flux extends along the path of the vehicle's motion. As seen in FIG. 4A, the magnetic loop is closed between adjacent poles of the rotor and stator. The length of this loop is equal to the length $\tau$ of the phase coils.

The induction created by the rotor magnet assembly in the stator air gap is constant and is roughly equal to 0.5 T. However, to increase the vehicle's speed in a given section of the stator, the length of the poles in that section, and hence the area of the poles, must increase. As a result, the magnetic flux passing through the core, as well as the magnetic resistance thereto, increases throughout the acceleration section, achieving its maximum value in the constant-speed section of the stator.

The core's electromagnetic steel becomes saturated when its induction attains a value of 1.7 T. Therefore, to avoid core saturation and the deterioration in motor performance associated therewith, the width of the core must be sufficiently large so that the maximum flux passing through the core will not drive the induction beyond its maximum value. For example, if the ac current has an alternating current frequency of f=25 Hz and the vehicle has a velocity v=150 m/sec, the length of the pole pitch is:

$$\Delta \approx \tau = \frac{V}{2f} = 3m$$

Given this length, the width of the core disclosed in the copending application should be no less than:

$$\frac{B\Delta}{1.7} = 0.9m$$

The weight of a stator having a core of such a width is very great. To overcome this problem, in the present invention the magnetic flux is closed in a plane perpendicular to the direction of the vehicle's motion and flows into one of the pole projections, across the core back and out of the other pole projection.

As shown in FIG. 5, $b_o$ represents the height of the pole projection, h the height of the core back, and b the width of the core back. The cross magnetic permeance $Y_M$ of the core is defined as the magnetic permeance for the magnetic flux passing through the core back in the plane perpendicular to the direction of the vehicles' motion. Given the above dimensions, the cross magnetic permeance $Y_M$ of the core for the magnetic flux generated by one pole of the propulsion magnet will be:

$$Y_M = \frac{\mu(H)b\tau}{h} \quad (1)$$

where $\tau \approx \Delta$ is the length of the phase coil of the stator winding.

For this same flux, the total permeance $Y_o$ of both air gaps across their width g (which are separated by the propulsion magnet) is equal to:

$$Y_o = \frac{\mu_o b_o \tau}{2g} \quad (2)$$

The permeance $Y_{PM}$ through either the upper or lower portion of the propulsion magnet in a direction perpendicular to its longitudinal axis is:

$$Y_{PM} = \frac{1.07 \mu_o b_o \tau}{1.571 R} \quad (3)$$

where R is the radius of the cylindrical permanent magnets, and $1.07\mu_0$ is the magnetic permeability of the material from which the permanent magnet is manufactured. This magnetic material, known by the name Crumax 355, is formed from Ne, Fe, and B.

If the magnetic resistance of the pole projections 16 is ignored, the total magnetic permeance for the left half of the stator is determined by adding the formulas (1), (2), and (3):

$$Y = \frac{bb_o\mu(H)}{hb_o + (2g + 1.468R)b\mu(H)/\mu_o} \tau = k\tau \quad (4)$$

It is evident from formula (4) that the total magnetic permeance of the stator is directly proportional to the length of pole pitch $\Delta \approx \tau$. Since for this configuration $B = (mmf)Y/S = (mmf)k\tau/(b\tau)$, which is independent of the pole pitch length $\tau$, it follows that the magnitude of the induction in the stator back 15 is virtually constant throughout the length of the stator. As a consequence of this important characteristic of the present invention (i.e., the constant distribution of the magnetic flux in the steel core), it is possible to significantly reduce the volume, weight and cost of the stator. The width b of the stator back is determined by the maximum permissible magnitude of the induction $B_s$, which equals the value at which the core saturates.

Assuming that $B_s = 1.7$ T, the magnetic flux in the core, which is generated by a pole is:

$$\psi = B_o \cdot b_o \tau = B_s \cdot b \cdot \tau \quad (5)$$

therefore:

$$b = b_o \frac{B_o}{B_s} = 0.12 \frac{0.5}{1.7} = 0.0353 m$$

It follows that the cross-sectional size of the core must be:

$$(b+d) \times (2b_o + h) = (3.5 + 4.5) \times (20 + 9.5) = 8 \times 29.5$$
$$cm^2 = 236 \ cm^2$$

In comparison, the cross-sectional dimension of the linear synchronous motor in the copending application is equal to:

$$24 \times 88 = 2112 \ cm^2$$

Thus, the present invention advantageously reduces the cross-sectional dimension of the core by nine times. However, the cross section of the lines of the stator winding in the linear synchronous motor disclosed in the copending application are almost twice as small as in the linear synchronous motor of the present invention.

The provision of permanent magnets that are divided into two equal parts, together with the provision of two pole projections for each stator core, effectively doubles the levitational force created by the energy of the magnetic field generated by the permanent magnets in comparison to the motor disclosed in the copending application. The following discussion will illustrate that this assertion is correct.

Just as in the linear synchronous motor disclosed in the copending application, the levitational force acting on the rotor of the linear synchronous motor of the present invention is created as a result of stretching the magnetic flux tubes formed by the permanent magnets in the motor's air gap. This effect is illustrated in FIG. 4B for the motor disclosed in the copending application and in FIG. 5 for the motor of the present invention. It is this deformation of the magnetic field that is the source of the levitational force. The magnitude of the levitational force is equal to the partial derivative of the magnetic field energy with respect to the coordinate corresponding to the shift $\delta$ of the rotor that produces the deformation of the field. This relation is valid as long as the strength of the field sources is unaltered by the shift. It now will be demonstrated that in the linear synchronous motor of the present invention the magnitude of the levitational force acting on the propulsion magnet is virtually twice as large as in the linear synchronous motor disclosed in the copending application. First, the energy contained in the magnetic flux tubes will be calculated for the motor disclosed in the copending application and illustrated in FIG. 4B.

Following conventional practice, the permanent magnets will be modeled by a coil having a current, as indicated in FIG. 4B. The equivalent current in the magnet is $I = \pi/2 \ R \cdot M$, where $M = 8.9 \times 10^5$ A/M is the coercive force of the Crumax 355 magnet, and $\pi/2 \ R$ is the width the permanent magnets would have if their cross-section were rectangular rather than circular with a diameter of 2R, assuming both cross-sections produce the same effects.

In this model, the magnitude of the levitational force $F_L$ is determined by the formula:

$$F_L = \frac{\partial E}{\partial \delta}\bigg|_{I=Const} \quad (8)$$

where E is the energy of the magnetic field of the motor per meter of length along the stator. The following equations will all be written in terms of a unit length along the stator.

If it is assumed that the magnetic permeability of the steel core steel is $\mu_s = \infty$, and noting that the motor is symmetrical relative to a vertical plane and that the length of each pole pitch is finite, it is easy to prove that the magnetic potentials $\phi_{SL}$ and $\phi_{SR}$ of the left and the right cores, respectively, are identical and equal to zero.

The magnetic magazine containing the cylindrical permanent magnets 10 includes two steel walls 8 divided by non-magnetic separators. The magnetic potentials of the walls do not vary with height and are equal to:

$$\phi_L = \phi_{SL} - H_o g = -H_o g \quad \phi_R \approx H_o g - \phi_{SR} = H_o g \quad (9)$$

where $H_o$ is the strength of the magnetic field in that section of the air gap where the field is uniform, such as in the hatched area of FIG. 4.

The hatched area seen in FIG. 4B represents a magnetic field tube having a height of $S_T = g/2$. Two sections along the body of the propulsion magnet will be considered: one section where the magnetic field is uniform and one section where it is nonuniform.

First, a single tube will be analyzed in the section of the air gap where the field is uniform. The magnetic resistance $r_o$ of the part of this tube located in the air gap is:

$$r_o = \frac{2g}{\mu_o g/2} = \frac{4}{\mu_o} \tag{10}$$

The magnetic resistance $r_m$ of the portion of the tube located in the body of the permanent magnet, which has a magnetic permeability of $\mu_m = 1.07\mu_o$, is:

$$r_m = \frac{\pi R}{1.07 g \mu_o} \tag{11}$$

The total magnetic resistance of the tube is thus:

$$r = r_o + r_m = \frac{1}{\mu_o}\left(4 + \frac{\pi R}{1.07 g}\right) \tag{12}$$

The magnetic flux $\Delta\psi$ in the tube can be determined from Ohm's Law for the magnetic circuit:

$$\frac{I}{r} = \Delta\psi = \mu_o H_o g/2 = \frac{\mu_o R M \pi/2}{4 + \pi R/1.07 g} \tag{13}$$

Solving equation (13) for the magnetic field $H_o$ in the air gap results in:

$$H_o = \frac{\pi R M}{4g + \pi R/1.07} = \frac{1.07 M}{1 + 1.3624 g/R} \tag{14}$$

The value of the tube's magnetic field $H_M$ in the body of the magnet is constant and, according to Kirchhof's Law for the magnetic circuit, equals:

$$H_m = \frac{I - 2H_o g}{\pi R/2} = \frac{M}{1 + 1.3624 g/R} = \frac{H_o}{1.07} \tag{15}$$

When the weight of the vehicle forces the propulsion magnet to shift downward in the air gap, the magnetic flux tubes near the bottom of the permanent magnet enter into an area where the air gap widens abruptly. Hence, a portion of the tubes (those located in the air rather than in the magnet) increase in length. Consequently, the tubes' resistance to the magnetic flux increases, the magnetic induction and the strength of the field in the lower tubes decreases, and the energy of the magnetic field contained in the tubes abruptly declines.

Let the energy of one field tube in the uniform part of the field equal $\Delta E$. Further, let the energy of one field tube in the non-uniform, weakened, part of the field near the bottom of the permanent magnet equal $\Delta E_L$. When the propulsion magnet is shifted downward by a distance of $g/2$ (a distance equal to the height of one tube) one tube in the uniform part of the field is eliminated and one tube in the non-uniform part of the field is created. Thus, the total energy contained in the uniform part of the field is decreased by $\Delta E$ while at the same time the total energy contained in the non-uniform part of the field increases by $E_L$. Therefore, when the propulsion magnet is shifted downward by a distance $g/2$, the net change in the energy of the field is equal to $|-\Delta E + \Delta E_L|$.

Calculations show that the magnitude of the magnetic field energy $\Delta E_L$ is no greater than $0.1\Delta E$ when the tube is shifted below the base of the core by $\delta = 2$ g. Therefore, once the energy $\Delta E$ of the tube in the uniform field has been determined, it is easy to determine the magnitude of the levitational force $F_L$ created by the linear synchronous motor disclosed in the copending application.

Rewriting differential equation (8) as a difference equation results in:

$$F_L = \frac{\partial E}{\partial \delta}\bigg|_{I=Const} \approx \frac{\Delta E - \Delta E_L}{\Delta \delta} \geq \frac{0.9\Delta E}{g/2} \tag{16}$$

The total energy $\Delta E$ can be divided into two portions:

$$\Delta E = \Delta E_{ag} + \Delta E_M \tag{17}$$

where $\Delta E_{ag}$ is the energy of the portion of the tube formed by the uniform field located in the air gap and $\Delta E_M$ is the energy of the portion of the same tube located in the body of the permanent magnet. Then:

$$\Delta E_{ag} = \frac{\mu_o H_o^2}{2} V_{ag} = \frac{1.07^2 M^2 g^2 \mu_o}{2(1 + 1.3624 g/R)^2} \tag{18}$$

where $V_{ag} = g^2$ is the volume of the portion of the tube located in the air gap. Furthermore:

$$\Delta E_M = \frac{1.07\mu_o H_M^2}{2} V_M = \frac{1.07^2 M^2 \pi R g \mu_o}{8(1 + 1.3624 g/R)^2} \tag{19}$$

where $V_M = \pi R g/4$ is the volume of the portion of the tube located in the body of the permanent magnet.

Adding equations (18) and (19) results in the total energy:

$$\Delta E = \frac{1.07^2 M^2 g \mu_o}{2(1 + 1.3624 g/R)^2}\left(g + \frac{\pi}{4} R\right) \tag{20}$$

Inserting equation (20) into equation (16) results in an expression for the levitational force created by the linear synchronous motor disclosed in the copending application:

$$F_L \geq \frac{1.03 \mu_o M^2 (g + 0.7854 R)}{(1 + 1.3624 g/R)^2} \; N/m \tag{21}$$

Assuming that $\mu_o = 4\pi \times 10^{-7}$, $M = 8.9 \times 10^5$, $g = 0.025$, and $R = 0.03$ m, the value of $F_L$ is estimated to be:

$$F_L \geq 10922 N/m \approx 1.1 \text{ tons}$$

In contrast to the linear synchronous motor disclosed in the copending application, when the propulsion magnet of the linear synchronous motor of the present invention is shifted downward by a value of $g/2$ to the position indicated in FIG. 5, the volume of the uniform field decreases by two magnetic flux tubes while the volume of the weaker, non-uniform field increases by two flux tubes. The above calculation performed to determine the total energy change of the magnetic field can be repeated for the linear synchronous motor of the present invention. Because there are now two flux tubes that change in energy instead of one, the total change in energy of the magnetic field is $[-2\Delta E + 0.2\Delta E]$, or twice the total change in energy of the magnetic field in the motor disclosed in the copending application. The remainder of the above calculations remain unchanged.

As a result, for a given value of the shift $\delta$, the present invention provides a levitation force essentially double that of the force provided by the motor in the copending application. Additional calculations demonstrate that an additional shift of the propulsion magnet by 1 cm beyond the position indicated in FIG. 5 increases the levitation force from 200 kg to 2 tons.

What is claimed is:

1. A linear synchronous motor for a high speed vehicle comprising:
   a. a linear stator assembly divided into sections and having an air gap, said stator assembly generating a magnetic field traveling wave in said air gap from an alternating current source, said traveling wave having variable speeds and accelerations along different sections of said stator assembly;
   b. a rotor assembly having at least one propulsion magnet forming at least one pole-pitch of a selected length that is selectively variable while the vehicle is in motion, said at least one magnet including an upper portion, a lower portion spaced apart from said upper portion, and a nonmagnetic coupler rigidly coupling said upper portion to said lower portion, said rotor assembly coupled to the vehicle and disposed in said air gap of the stator and movable laterally with respect to said stator, said rotor assembly generating a magnetic flux that produces an attractive force between a magnetic field of said rotor assembly and said traveling wave of the stator assembly, said magnetic field of said rotor assembly propelling said vehicle and generating a levitation force levitating the vehicle; and
   c. a synchronizing unit operatively associated with said rotor assembly to vary the length of the pole-pitch such that said pole-pitch length is substantially equal to one-half the length of the traveling wave at any given position along said linear stator assembly.

2. The linear synchronous motor of claim 1 wherein said at least one propulsion magnet comprises a plurality of propulsion magnets and said upper portion of each propulsion magnet includes an upper right circular cylindrical permanent magnet and said lower portion of each propulsion magnet includes a lower right circular cylindrical permanent magnet, said upper and lower permanent magnets of each propulsion magnet having a common longitudinal axis forming a plurality of common longitudinal axes, said plurality of common longitudinal axes disposed in a common plane, each of said upper permanent magnets having a first direction of magnetization and each of said lower permanent magnets having a second direction of magnetization, said first and second directions of magnetization being perpendicular to said common longitudinal axis and opposite in direction relative to one another, said upper and lower permanent magnets of each of said propulsion magnets forming a rigid unit that is rotatable about its common longitudinal axis to vary said pole pitch length of the rotor.

3. The linear synchronous motor of claim 2 wherein said linear stator assembly comprises two mirror-image, symmetrical laminated steel cores having a lateral extent with said air gap therebetween, each of said cores having a back portion extending parallel to said longitudinal axes of said permanent magnets of the rotor and upper and lower projections extending into the air gap.

4. The linear synchronous motor of claim 3 wherein said common plane containing said plurality of common longitudinal axes is parallel to said lateral extent of said stator cores.

5. The linear synchronous motor of claim 4 wherein said upper projection of the core has upper phase coils and said lower projection of the core has lower phase coils, said upper and lower phase coils having three-phase windings generating alternating currents that are equal in magnitude but opposite in direction to one another at any given time.

6. The linear synchronous motor of claim 4 wherein said magnetic flux generated by the rotor assembly forms a closed loop in a plane perpendicular to said lateral extent of the linear stator assembly, said loop traversing a path in each of said cores that enters one of said core projections and emanates from the other core projection, each of said cores having a magnetic permeance along said path that has a magnitude directly proportional to the wavelength of the traveling wave generated by said stator assembly, whereby a magnitude of the magnetic field in said cores along said path remains substantially constant.

7. The linear synchronous motor of claim 6 wherein said upper permanent magnet and said lower permanent magnet of each propulsion magnet are downwardly movable an asymmetry distance in said air gap relative to said upper and lower projections of said cores, respectively, upon exertion of weight of said vehicle, said upper and lower permanent magnets each automatically generating a portion of said levitation force.

8. The linear synchronous motor of claim 7 wherein said back portion of each of said cores is formed by vertically extending laminates, and said upper and lower projections of each of said cores is formed by horizontally extending laminates.

9. The linear synchronous motor of claim 1 further comprising:
   a magnetic magazine having an upper part containing said upper portion of said permanent magnet and having a lower part containing said lower portion of said permanent magnet; and
   a non-magnetic bridge rigidly coupling said upper part of said magazine to said lower part.

10. The linear synchronous motor of claim 5 wherein each of said cores of said stator assembly is formed from individual stator sub-units coupled by three leads of said three-phase windings.

11. The linear synchronous motor of claim 10 wherein each sub-unit includes end portions each having at least two turns for each one of said three-phase windings.

12. The linear synchronous motor of claim 11 wherein each sub-unit has a length substantially equal to a multiple of the wavelength of said magnetic field traveling wave in said section of the stator assembly in which said sub-unit is disposed.

13. The linear synchronous motor of claim 1 wherein said alternating current source is a constant frequency alternating current source.

14. A linear synchronous motor comprising:
   a. a linear stator assembly having a plurality of phase coils extending along its length;

b. a propulsion magnet assembly rigidly coupled to a vehicle and operatively associated with, and movable along, the linear stator assembly to establish a gap therebetween the propulsion magnet assembly having a plurality of permanent magnets arranged in a generally linear array, and defining a pole-pitch, each of said permanent magnets including an upper portion, a lower portion spaced apart form said upper portion, and a nonmagnetic coupler rigidly coupling said upper portion to said lower portion;

c. means, operatively associated with the linear stator assembly, for generating a magnetic field traveling wave in the gap that has a variable wavelength along the length of the linear stator; and d. means, operatively associated with the propulsion magnet assembly, for varying the pole pitch of the permanent magnet array such that the pole pitch is substantially equal to one-half the wavelength of the traveling wave at any given point along the linear stator.

15. The linear synchronous motor of claim 14 wherein said at least one propulsion magnet comprises a plurality of propulsion magnets and said upper portion of each propulsion magnet includes an upper right circular cylindrical permanent magnet and said lower portion of each propulsion magnet includes a lower right circular cylindrical permanent magnet, said upper and lower permanent magnets of each propulsion magnet having a common longitudinal axis, said longitudinal axes disposed in a common plane, each of said upper permanent magnets having a first direction of magnetization and each of said lower permanent magnets having a second direction of magnetization, said first and second directions of magnetization being perpendicular to said longitudinal axis and opposite in direction relative to one another, said upper and lower permanent magnets of each of said propulsion magnets forming a rigid unit that is rotatable about said longitudinal axis to vary said pole pitch length of the rotor assembly.

16. A linear synchronous motor comprising:

a. a linear stator assembly having two ferromagnetic cores symmetrical about a plane such that an air gap is formed between said cores that extends in a longitudinal direction substantially parallel to said plane, each of said ferromagnetic cores having windings formed of phase coils, a length of the phase coils and a spacing between centers of adjacent phase coils varying along the longitudinal axis of said stator and providing predetermined changes in the length and speed of magnetic field traveling waves generated in said air gap by the phase coils of each ferromagnetic core of said stator assembly; and b. a propulsion magnet assembly rigidly coupled to a vehicle and disposed in said air gap of said stator assembly, said propulsion magnet assembly generating a magnetic flux that forms a closed loop in a plane perpendicular to said longitudinal direction along said linear stator assembly, said loop traversing a path in each of said cores, said propulsion magnet assembly propelling said vehicle.

17. The linear synchronous motor of claim 16 wherein said stator assembly generates a magnetic field traveling wave, and each of said cores has a magnetic permeance along said path that has a magnitude directly proportional to the wavelength of the magnetic field traveling wave, whereby a magnitude of the magnetic field in said cores along said path remains substantially constant.

18. The linear synchronous motor of claim 16 wherein said stator assembly further comprises:

a. an acceleration section in which the length of the phase coils and a spacing between centers of adjacent phase coils both increase in a direction of travel of the propulsion magnet assembly;

b. constant speed section in which the length of the phase coils and spacing between centers of adjacent phase coils are substantially uniform; and c. a deceleration section in which the length of the phase coils and a spacing between centers of adjacent phase coils both decrease in a direction of travel of the propulsion magnet assembly.

19. A linear synchronous motor comprising:

a. a linear stator assembly having a plurality of phase coils extending along its length;

b. a propulsion magnet assembly rigidly coupled to a vehicle and operatively associated with, and movable along, the linear stator assembly to establish a gap therebetween the propulsion magnet assembly having a plurality of magnets arranged in a generally linear array, and defining a pole-pitch, each of said magnets including an upper portion, a lower portion spaced apart from said upper portion, and a nonmagnetic coupler rigidly coupling said upper portion to said lower portion;

c. means, operatively associated with the linear stator assembly, for generating a magnetic field traveling wave in the gap that has a variable wavelength along the length of the linear stator; and d. means, operatively associated with the propulsion magnet assembly, for varying the pole pitch of the permanent magnet array such that the pole pitch is substantially equal to one-half the wavelength of the traveling wave at any given point along the linear stator.

* * * * *

UNITED STATES PATENT AND TRADEMARK OFFICE
CERTIFICATE OF CORRECTION

PATENT NO. : 5,225,726
DATED : July 6, 1993
INVENTOR(S) : Oleg Tozoni

It is certified that error appears in the above-indentified patent and that said Letters Patent is hereby corrected as shown below:

| Column | Line | |
|---|---|---|
| 4 | 26 | Change "effects" to --affect--. |
| 10 | 62 | Change "$\phi_L = \phi_{SL}$" to --$\phi_L \cong \phi_{SL}$--; change "$\phi_R \approx H_o g$" to --$\phi_R \cong H_o g$--. |
| 11 | 41 | In formula 15, change "$H_m =$" to --$H_m \cong$--. |
| 11 | 48 | After "air" insert --gap--. |
| 11 | 65 | Change "$E_L$" to --$\triangle E_L$--. |
| 14 | 9 | Before "cores" delete "stator". |
| 14 | 32 | Change "asymmetry" to --asymmetrical--. |
| 15 | 4 | After "therebetween" insert --,--. |
| 16 | 38 | After "therebetween" insert --,--. |

Signed and Sealed this

Twenty-fourth Day of May, 1994

Attest:

BRUCE LEHMAN

*Attesting Officer*       *Commissioner of Patents and Trademarks*